May 2, 1950        M. J. DUZMAL        2,506,073
EGG SHELLER
Filed Aug. 2, 1946
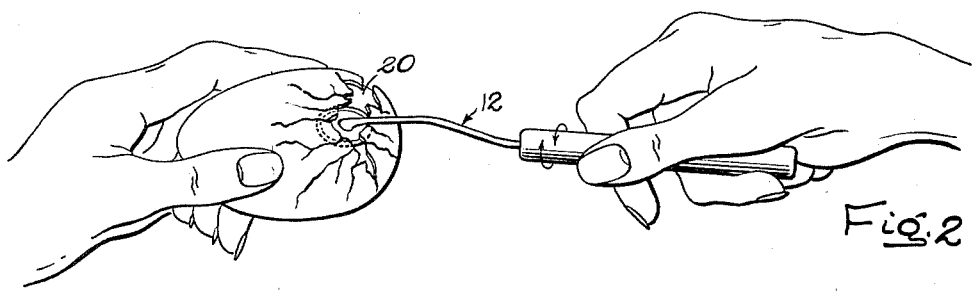
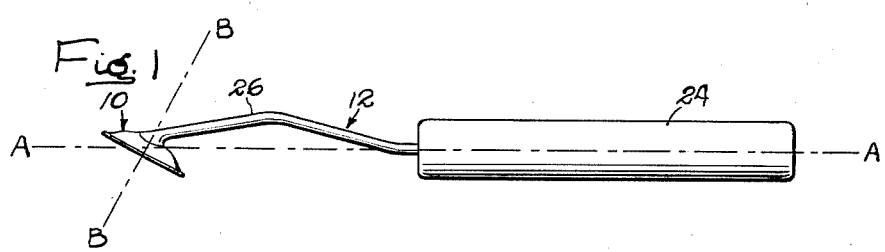
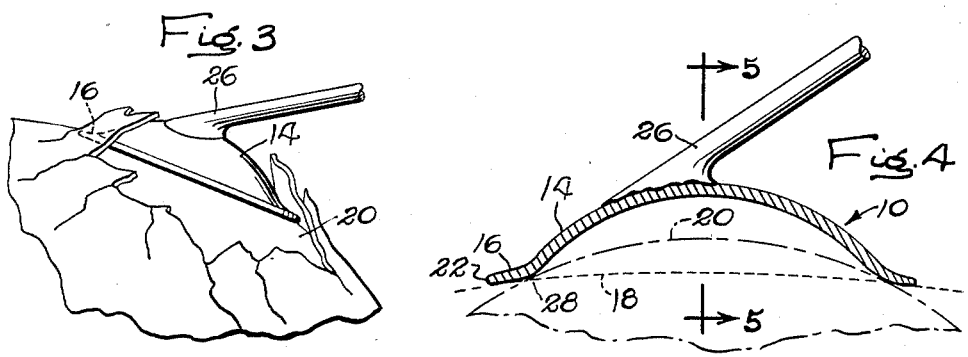
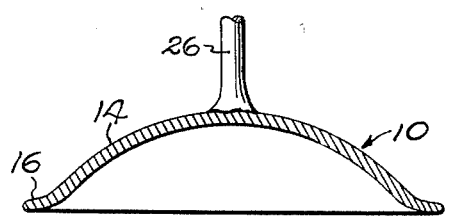
INVENTOR
Michael J. Duzmal
Carlson Pitzner Hubbard & Wolfe
ATTORNEYS Patented May 2, 1950

2,506,073

UNITED STATES PATENT OFFICE 2,506,073

EGG SHELLER

Michael J. Duzmal, South Chicago, Ill.

Application August 2, 1946, Serial No. 687,890

1 Claim. (Cl. 146—2)

The present invention relates to an egg sheller for stripping the shell from both hard and soft boiled eggs.

It is an object of the invention to provide an egg sheller adapted for insertion under the shell of a boiled egg to strip the shell cleanly from the edible portion and which is so constructed as to be free from any tendency to dig into the latter. It is a correlative object to provide an egg sheller which accomplishes its function quickly, even in the hands of an unskilled operator.

It is an object of the invention not only to produce an egg sheller which may be used with maximum efficiency in the case of soft and hard boiled eggs, but which is in addition well adapted for removing the skins from boiled or baked potatoes and the like.

It is a further object to provide a device of the class described which is inherently durable and adapted to withstand considerable use and mistreatment and which may nevertheless be fabricated sufficiently cheaply to enable widespread use in homes as well as in connection with the commercial preparation of food.

Other objects and advantages of the invention will become apparent as the following description proceeds taken in connection with the accompanying drawings, in which:

Figure 1 is a side view showing an egg sheller embodying my invention.

Fig. 2 shows the manner in which the egg sheller disclosed in Fig. 1 may be employed in the shelling of an egg.

Fig. 3 is an enlarged detailed view showing the disk portion of the sheller in contact with the edible portion of the egg and partially inserted under the shell thereof.

Fig. 4 is an enlarged cross sectional view taken along the center line of the shelling disk and in a direction parallel to the attached handle.

Fig. 5 is an enlarged cross sectional view taken along line 5—5 of Fig. 4.

While the invention is susceptible of various modifications and alternative constructions, I have shown in detail and will herein describe the preferred embodiment, but it is to be understood that I do not thereby intend to limit the invention to the specific form disclosed but intend to cover all modifications and alternative constructions falling within the spirit and scope of the invention as expressed in the appended claims.

Although both hard boiled eggs and soft boiled eggs are a recognized staple in domestic and commercial cookery, it is a matter of common knowledge that the complete removal of the shell may be both annoying and time consuming. In the case of hard boiled eggs one of two methods for removing the shell is generally used; the shell is either picked off with the fingernail or removed with a spoon, knife or other table implement having a sharp edge which may be inserted between the edible portion and the shell. Both of these methods are unsatisfactory, the first because it is awkward and unsanitary and the second because the sharp edge of the instrument, particularly where a spoon is used, tends to bite into the edible portion which is not only wasteful of the egg but spoils its appearance. In the case of soft boiled eggs the practice of cutting the egg in half with a knife or spoon and scooping out the edible portion is too well known to require discussion. In addition to being messy and wasteful, the latter incurs the probability that small pieces of the shell will be dislodged into the edible portion to cause inconvenience as the egg is consumed and in the case of small children may actually be dangerous. As a result of such difficulties, commercial establishments have found the shelling of eggs in a large quantity to be uneconomical and in some cases have discontinued this service to the customer.

Referring now to Fig. 1, it will be seen that the egg sheller of my preferred embodiment includes a shell removing disk indicated generally at 10 which is rigidly fastened for purposes of manipulation to a handle 12. As shown in the enlarged cross-sectional views, Figs. 4 and 5, the shell removing disk is concavo-convex in shape and may be conveniently formed merely by deforming a flat circular blank of metal by dies of the proper size and shape. The overall diameter of the disk 10 is not critical, although I have found that a diameter approximately equal to one-half the lesser diameter of an egg is quite satisfactory.

For a reason which will later appear, I prefer to form the central portion so that it has a curvature which exceeds the maximum curvature of any portion of the surface of an average egg, the region of maximum curvature being indicated at 14. Around the circular outer edge of the portion 14 of the disk is an integrally formed flange 16 which extends generally outward. Although the flange 16 may be formed so as to lie in a planar surface, I prefer to form the flange as a portion of a circular sphere having a surface 18 and of a curvature which is considerably less than that encountered in an average egg. The surface 20 of an egg has been indicated at 20 in Fig. 4 in dot dash lines to show that the curvature is intermediate that of the body portion 14 and the flange surface 18. The curvature of both of the surfaces 14, 18 may approach the minimum curvature of the egg, if desired, however. Since the disk 10 is preferably formed of light gauge material, the presented edge 22, which is preferably rounded off and polished, will nevertheless have a shearing or parting effect as it is inserted between the shell and the edible portion of an egg.

The manner in which the sheller is used is set forth in detail in Figs. 2 and 3. Here it will be noted that the sheller disk 10, after the shell has been cracked by any desired means, is forced under the edge of the shell and into flat bodily contact with the smooth surface 20 of the egg inside the membrane. After the disk is inserted under the shell, it may be moved in any desired direction, the concave portion 14 of the disk tending to expand the shell by wedging it upwardly along the outer curved surface 14 of the disk. This splits the membrane and causes the shell itself to crack into small pieces, whereupon it may be easily lifted off still attached to the membrane. It has been found that cracking the egg shell by preliminary forceful rolling increases the speed with which the shell may be removed.

In order to facilitate the movement of the disk 10 beneath the shell, means are provided whereby the disk may be given an orbital or rolling motion so that there is no tendency for the disk to leave the surface of the egg in a tangential direction. In the present embodiment this is accomplished by including at the end of the handle 12 a generally cylindrical handgrip 24 and by so forming an interconnecting rod 26 that the axis A—A of the handgrip 24 passes through, or at least closely adjacent to, the disk 10. It has further been found desirable to fasten the rod 26, by soldering, brazing or the like, to the center of the convex portion 14 of the disk in such a way that the central axis B—B of the disk makes an angle of approximately 45 degrees with respect to the axis A—A of the handgrip.

With the axes A—A and B—B arranged as described, a mere rotary motion of the wrist suffices to guide the shelling disk 10 around the surface of the egg, the position of the egg itself being changed from time to time as the shelling progresses. Or, alternatively, the handgrip 24 may be rolled between the fingers to impart a rolling or rotary motion to the disk 10 about the axis A—A. Since either the wrist motion or the finger motion referred to are perfectly natural, it has been found that the average person can remove the shell from an egg quickly and easily without following any particular set of instructions and without having to develop any special techniques or skill. It will be understood, however, that the primary feature of my invention is the manner in which the shelling disk 10 is constructed, and if desired other specific types of handles may be used in connection with the disk 10 without departing from my teachings.

In order to understand more completely the manner in which the sheller disk 10 operates, Figs. 3 and 4 will be referred to in somewhat greater detail. It has been stated above that the disk 10 has two portions of different curvature, namely, the central portion 14 and the flange portion 16, the latter being of lesser curvature than the surface of an egg. These two surfaces join in an annular area 28, which, when the disk is brought into contact with the egg, forms the region of engagement. The annular contacting area 28 during the shelling operation rides on the smooth surface of the egg, automatically orienting the flange 16 to assume a proper angle in which the flange is directed away from, and not into, the edible portion of the egg. Thus the flange 16 at all times acts to scrape the inside of the shell membrane concurrently with applying an expanding or breaking force on the shell itself. Since the surface of the edible portion is quite resilient, it is possible merely by applying a slightly greater normal pressure, to cause the sheller disk to press down more tightly against the egg in the annular region 28. In this way the effect of the flange 16 may be varied and the scraping effect on the inside of the shell either increased or decreased.

Although the invention has been described with particular reference to a rather firm hard boiled egg, it has been found in practice that the sheller may be readily employed with eggs that are quite soft. Since the particular construction of the shelling disk makes it virtually impossible for the disk to dig into the surface of the egg, it is possible to peel such an egg without breaking the yolk. This feature is particularly advantageous in hospitals, restaurants and the like, where the eggs must be kept warm until ready to be eaten.

It has been found that the shelling tool described may be advantageously employed in removing the peeling from baked or boiled potatoes, or, as a matter of fact, in removing the outer covering from any vegetable where such covering has previously been loosened during the process of cooking.

Because of the extreme simplicity of the device, it may be easily and cheaply manufactured, thereby enabling the device to be used, along with a knife, fork, and spoon, as a personal table implement. It is also ideally suited for commercial use in the course of which it may be necessary for an operator to shell many dozens of boiled eggs in a relatively short time. Production shelling may be accomplished even by an inexperienced operator quickly and without fatigue with the assurance that each of the shelled eggs will present a pleasing and appetizing appearance.

I claim as my invention:

A device for removing the shell from boiled eggs comprising a generally circular disk of light gauge rigid material and having a diameter approximately one-half the smaller diameter of an average egg, the central portion of said disk being of concavo-convex form to mate with the convex surface of said egg but having a curvature which is at least equal to the maximum curvature of any portion of said egg, a handle fastened near the center of the convex side of said disk and extending from the axis of the disk at an angle thereto, said handle having a generally cylindrical gripping portion, the axis of said gripping portion being so oriented that the extended axis thereof passes in the vicintiy of said disk, an integral flange at the outer edge of said disk and forming a flared extension of the central portion thereof, the curvature of the surface formed by said flange being less than the curvature of the central portion of said disk so that upon forcing said disk under the shell and rotating said disk by rolling the handle between the fingers the shell may be wedgingly stripped from the egg with no tendency for said flange to cut into said egg.

MICHAEL J. DUZMAL.

REFERENCES CITED

The following references are of record in the file of this patent:

UNITED STATES PATENTS

| Number | Name | Date |
|---|---|---|
| 1,644,119 | Fowler | Oct. 4, 1927 |
| 1,982,193 | Darr | Nov. 27, 1934 |

FOREIGN PATENTS

| Number | Country | Date |
|---|---|---|
| 15,973 | Great Britain | Sept. 8, 1900 |
| 464,687 | France | Jan. 20, 1914 |
| 513,053 | France | Oct. 27, 1920 |